(12) United States Patent
Takatori

(10) Patent No.: US 6,252,629 B1
(45) Date of Patent: Jun. 26, 2001

(54) TIMER-RECORDING CONTROLLER FOR CONTROLLING A TIMER-RECORDING APPARATUS USED TO RECORD A BROADCAST AUDIO SIGNAL, A BROADCAST VIDEO SIGNAL, OR A BROADCAST DATA SIGNAL

(75) Inventor: Masahiro Takatori, Toyonaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/208,421

(22) Filed: Dec. 10, 1998

(30) Foreign Application Priority Data

Dec. 26, 1997 (JP) .................................................. 9-359595

(51) Int. Cl.$^7$ ................................................ H04N 7/00
(52) U.S. Cl. ............................................ 348/460; 386/83
(58) Field of Search .................................. 348/906, 460, 348/552, 5.5; 386/45, 65, 62; 725/141, 153, 133

(56) References Cited

U.S. PATENT DOCUMENTS

| | | | |
|---|---|---|---|
| 4,908,707 | * 3/1990 | Kinghorn | 358/147 |
| 5,852,478 | * 12/1998 | Kwoh | 348/234 |
| 5,963,264 | * 10/1999 | Jackson | 348/460 |
| 6,078,348 | * 6/2000 | Klosterman | 348/10 |

FOREIGN PATENT DOCUMENTS

| | | |
|---|---|---|
| 9-180292 | 7/1997 | (JP) . |
| 10-21601 | 1/1998 | (JP) . |
| 10-174037 | 6/1998 | (JP) . |

* cited by examiner

Primary Examiner—Victor R. Kostak
(74) Attorney, Agent, or Firm—Wenderoth, Lind & Ponack, LLP.

(57) ABSTRACT

A timer-recording controller receiving a broadcast signal multiplexed with program information containing information representing broadcast sources, broadcast starting times, broadcast ending times, and genres of a plurality of broadcast-scheduled programs. The time-recording controller for controlling a recorder on the basis of the program information to timer-record a desired program among the plurality of programs comprises a timer-recording scheduled program list producer and a recorder controller for causing the recorder to timer-record the desired program at the broadcast-scheduled time of the desired program. Further, a detector detects a program which may delay the broadcast time of the timer-recording scheduled program from among the broadcast-scheduled programs. A user operates a user's instructions input unit in accordance with the detected result to control the timer-recording scheduled program list producer and the recorder controller to delay the time at which the recorder ends recording by a desired time.

15 Claims, 9 Drawing Sheets

| Ib | Ibs | Ibd | | | Ibb | | | Ibe | | | Ibj |
|---|---|---|---|---|---|---|---|---|---|---|---|
| Code | Ca | Cb | Cc | Cd | Ce | Cf | Cg | Ch | Ci | Cj | Ck |

Fig. 3

| Genre | Ck |
|---|---|
| Movie | Ck1 |
| Drama | Ck2 |
| Sports | Ck3 |
| Music | Ck4 |
| Show Business | Ck5 |
| Animation | Ck6 |
| News | Ck7 |
| Education | Ck8 |
| Hobby | Ck9 |
| Miscellaneousness | Ck10 |

TIMER-RECORDING CONTROLLER FOR CONTROLLING A TIMER-RECORDING APPARATUS USED TO RECORD A BROADCAST AUDIO SIGNAL, A BROADCAST VIDEO SIGNAL, OR A BROADCAST DATA SIGNAL

BACKGROUND OF THE INVENTION

1. Field of the Invention

The present invention relates to a timer-recording controller for use in a programmed recording apparatus performing a timer-recording or a programmed recording of a video signal which will be broadcast later. More specifically, the present invention relates to a timer-recording controller for controlling a timer-recording apparatus used to record an audio signal, a video signal, or a data signal being broadcast.

2. Description of the Background Art

Recently, a plan is being prepared to start a service of transmitting program list information composed of information showing contents of individual programs scheduled to be broadcast (hereinafter referred to as program information), in the multiplexed form, during the vertical retrace line interval by utilizing teletext. The use of this service allows users to obtain program information such as broadcast station, date, starting time, ending time, genre, and the like of broadcast-scheduled programs by decoding the program list information multiplexed with broadcast wave on the receiving side. Accordingly, users can automatically record desired programs (hereinafter referred to as timer recording) by storing the program information in advance and setting recording apparatus to start recording the desired programs at the beginning of broadcast (hereinafter referred to as scheduling of a timer-recording or programming of a timer-recording) on the basis of the stored program information.

In the program information, broadcasting time information representing the broadcasting time of programs includes broadcast starting time and broadcast ending time. When a timer-recording is programmed by utilizing the broadcasting time information, a preceding program started prior to the broadcast starting time of the program scheduled to be recorded (hereinafter referred to as a timer-recording scheduled program) may be prolonged over its broadcast ending time, as is often the case with sports game programs, for example.

When a program started prior to the timer-recording scheduled program (hereinafter referred to as a preceding program) is thus prolonged over the broadcast ending time, the timer-recording scheduled program is started after a time delay corresponding to the extension of the broadcasting time. That is to say, the broadcasting time period of the timer-recording scheduled program is shifted by the time for which the preceding program was prolonged.

However, with such recording apparatus as shown above, the scheduled recording starting time and the scheduled recording ending time of the timer-recording scheduled program are not updated in accordance with an extension of preceding programs. As a result, if a preceding program is prolonged as in the case of a sports game program, the timer-recording scheduled program is not recorded in the period of the extension.

An object of the present invention is to provide a timer-recording controller which can, when scheduling a timer-recording of a program, prolong the recording ending time of the timer-recording scheduled program for a given time in accordance with a decision of a user when a program broadcast prior to the timer-recording scheduled program may possibly be prolonged over its original broadcast ending time.

SUMMARY OF THE INVENTION

A first aspect of the present invention relates to a timer-recording controller receiving a broadcast signal multiplexed with program information containing information representing broadcast sources, broadcast starting times, broadcast ending times, and genres of a plurality of programs scheduled to be broadcast, for controlling a recorder on the basis of the program information to timer-record at least one particular program among the plurality of programs.

According to the first aspect, the timer-recording controller comprises:

a timer-recording controlling device for causing the recorder to start recording of the broadcast signal from the broadcast source of the particular program at the broadcast starting time of the particular program and end the recording at the broadcast ending time of the particular program;

a first program detector for detecting a program which may delay the broadcast time of the particular program from among the plurality of broadcast-scheduled programs; and a timer-recording control correction controller which can delay the time at which the recorder ends the recording by a desired time on the basis of the result detected by the first program detector.

As stated above, according to the first aspect of the present invention, when scheduling a timer-recording of a desired program whose broadcast starting time may be delayed due to a program broadcast earlier, the scheduled timer-recording time can be prolonged by a desired time in accordance with contents of the preceding broadcast program so that the desired program can be timer-recorded to the end.

According to a second aspect of the present invention, in the first aspect, the desired time includes zero.

As stated above, according to the second aspect of the present invention, the scheduled timer-recording time can be set without being prolonged.

According to a third aspect of the present invention, in the first aspect, the first program detector detects, from the program information, a program in a particular genre broadcast from the same broadcast source as the particular program at a broadcast starting time earlier than the broadcast starting time of the particular program.

As stated above, according to the third aspect of the present invention, a search can be made on the basis of a particular program genre to detect programs whose broadcasting time may probably be prolonged.

According to a fourth aspect of the present invention, in the first aspect, the timer-recording controller further comprises a display for displaying the result detected by the first program detector.

As stated above, according to the fourth aspect of the present invention, a user can decide whether to prolong the scheduled timer-recording time while checking a program which is scheduled to be broadcast before the timer-recording scheduled program and whose broadcasting time may be prolonged.

According to a fifth aspect of the present invention, in the fourth aspect, the timer-recording controller further comprises an input device for inputting an arbitrary time, which allows a user to input the arbitrary time as the desired time while checking the detected result displayed in the display.

As stated above, according to the fifth aspect of the present invention, a user can input a prolonging time for the scheduled timer-recording time which is decided while checking a program scheduled to be broadcast before the timer-recording scheduled program and whose broadcast time may be prolonged.

According to a sixth aspect of the present invention, in the first aspect, the timer-recording controller comprises a second program detector for detecting a program scheduled to start at a broadcast starting time earlier than the recording end time delayed by the given time from among the particular programs.

As stated above, according to the sixth aspect of the present invention, it is possible to check a following timer-recording scheduled program whose recording may be disrupted when the recording time for a preceding timer-recording scheduled program is prolonged.

According to a seventh aspect of the present invention, in the sixth aspect, the second program detector detects only a program broadcast from a broadcast source different from the broadcast source of the particular program which is delayed by the given time from among the detected programs.

As stated above, according to the seventh aspect of the present invention, programs from the same broadcast station which are probably prolonged when the broadcast time of a preceding program is prolonged are excluded from the objects of the detection to narrow down programs to be detected.

According to an eighth aspect of the present invention, in the sixth aspect, the timer-recording controller further comprises a display for displaying the result detected by the first program detector and the result detected by the second program detector.

As stated above, according to the eighth aspect of the present invention, it is possible to decide whether to prolong the scheduled timer-recording time while checking display of a program whose broadcasting time is possibly prolonged, a timer-recording scheduled program which, when the above-mentioned program is prolonged, may not be entirely recorded unless the scheduled timer-recording time is prolonged, and a following timer-recording scheduled program which may be affected by the extension of the scheduled timer-recording time.

According to a ninth aspect of the present invention, in the eighth aspect, the timer-recording controller further comprises an input device for inputting an arbitrary time, which allows a user to input the arbitrary time as the desired time while checking the detected results displayed in the display.

As stated above, according to the ninth aspect of the present invention, it is possible to input a prolonging time for the scheduled timer-recording time which is decided while checking display of a program whose broadcasting times is possibly prolonged, a timer-recording scheduled program which, when the above-mentioned program is prolonged, may not be completely recorded unless the scheduled timer-recording time is prolonged, and a following timer-recording scheduled program which may be affected by the extension of the scheduled timer-recording time.

According to a tenth aspect of the present invention, in the first aspect, the timer-recording controller further comprises an available recording time detector for detecting an available recording time in the recorder, wherein the time at which the recorder ends recording is delayed by the desired time on the basis of the detected available recording time.

As stated above, according to the tenth aspect of the present invention, whether to prolong the time for recording the timer-recording scheduled program can be decided on the basis of the available recording time of the recorder.

According to an eleventh aspect of the present invention, in the tenth aspect, the timer-recording controller further comprises a recording time comparator for comparing the available recording time and the recording time of the particular program when delayed by the desired time, and
  a timer-recording manager for delaying the time at which the recorder ends recording by the desired time when the available recording time is longer than the recording time.

As stated above, according to the eleventh aspect of the present invention, if the available recording time of the recorder is enough to record the entirety of the timer-recording scheduled program when its recording time is prolonged, the recording time for the timer-recording scheduled program is automatically prolonged, which saves the user from selecting and inputting.

According to a twelfth aspect of the present invention, in the eleventh aspect, the timer-recording controller further comprises a display for displaying the result detected by the first program detector and the available recording time when the available recording time is shorter than the recording time.

As stated above, according to the twelfth aspect of the present invention, when the recorder cannot record the entirety of a timer-recording scheduled program when its recording time is prolonged, whether to prolong the scheduled timer-recording time can be decided while checking the display of a program whose broadcasting time may possibly be prolonged, a timer-recording scheduled program which, when the above-mentioned program is prolonged, may not entirely be recorded unless its scheduled timer-recording time is prolonged, and the available recording time of the recorder.

According to a thirteenth aspect of the present invention, in the twelfth aspect, the timer-recording controller further comprises an input device for inputting an arbitrary time, which allows a user to input the arbitrary time as the desired time while checking the display on the display.

As stated above, according to the thirteenth aspect of the present invention, when the recorder cannot record the entirety of the timer-recording scheduled program when its recording time is prolonged, it is possible to input a prolonging time for the scheduled timer-recording time which is decided while checking the display of a program whose broadcasting time may possibly be prolonged, a timer-recording scheduled program which, when the above-mentioned program is prolonged, may not completely be recorded unless its scheduled timer-recording time is prolonged, and the available recording time of the recorder.

According to a fourteenth aspect of the present invention, in the fifth aspect, the timer-recording control correction controller comprises a delay time suggesting device for suggesting a given delay time for the desired time.

As stated above, according to the fourteenth aspect of the present invention, a given delay time is suggested as the desired prolonging time to save the user's trouble of inputting.

According to a fifteenth aspect of the present invention, in the fourteenth aspect, the delay time suggesting device updates the given delay time on the basis of statistics taken on the desired times inputted by the user.

As stated above, according to the fifteenth aspect of the present invention, the given delay time can be revised by a frequently adopted prolonging time to save the trouble of setting the prolonging time.

These and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will now be described in detail referring to the drawings.

(First Embodiment)

A timer-recording apparatus containing a timer-recording controller according to a first embodiment of the present invention will be described referring to FIGS. 1, 2, 3, and 4. In this invention, the timer-recording apparatus refers to a device designed to automatically record contents of broadcast programs on recording media at a real broadcasting time when program broadcasts formed with an audio signal, video signal, data signal a such as computer data, and the like broadcasted or transmitted on line or by radio from information sources are specified before they are actually broadcast. In this specification, a signal forming such a broadcast program is referred to as a program signal Sp.

Figure 1:
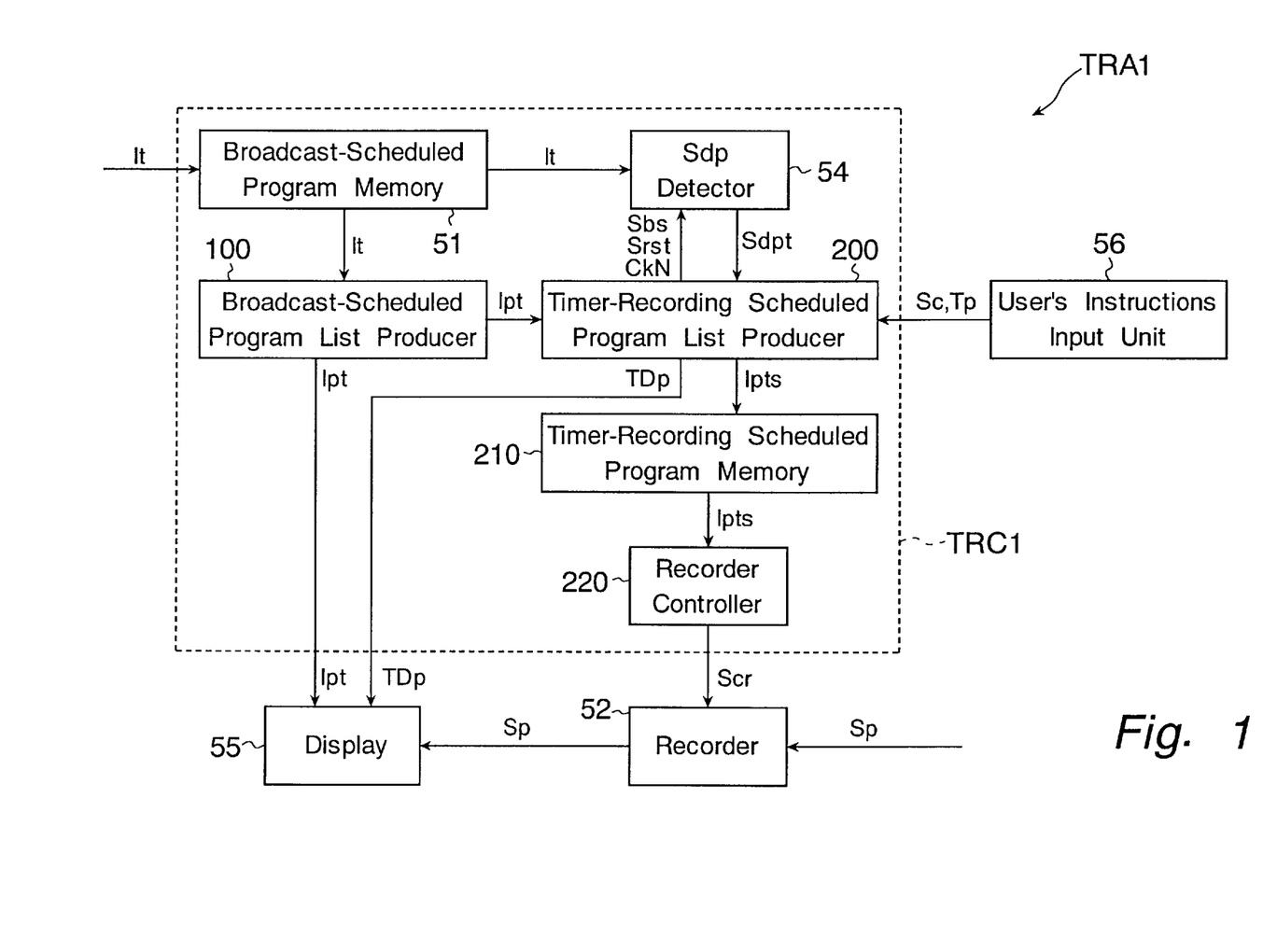
FIG. 1 is a block diagram showing a timer-recording apparatus containing a timer-recording controller according to a first embodiment of the present invention.

As shown in FIG. 1, a timer-recording apparatus TRA1 in this example includes a recorder 52, a timer-recording controller TRC1, a display 55, and a user's instructions input unit 56. The user's instructions input unit 56 is operated by a user, like a remote controller, to generate a timer-recording instruction signal Sc for signaling a timer-recording scheduling instruction for a program user who desires to record to the timer-recording controller TRC1.

The timer-recording controller TRC1 is connected to an external teletext decoder (not shown) to receive program information It, and is also connected to the user's instructions input unit 56 to receive the instruction signal Sc. On the basis of the program information It, the timer-recording controller TRC1 produces program list information Ipt showing contents of programs scheduled to be timer-recorded (hereinafter referred to as timer-recording scheduled programs Srp) among programs scheduled to be broadcast later on. The timer-recording controller TRC1 also generates timer-recording scheduled program list information Ipts for specifying timer-recording scheduled programs Srp on the basis of the program list information Ipt and the timer-recording instruction signal Sc.

The timer-recording controller TRC1 also detects timer-recording disrupting programs Sdp which may affect the scheduled broadcast time of timer-recording scheduled programs on the basis of the timer-recording scheduled program list information Ipts and the program information It to produce a timer-recording disrupting program list Sdpt. Further, the timer-recording controller TRC1 produces a timer-recording program and disrupting program list TDp showing both of the timer-recording scheduled programs Srp and the timer-recording disrupting programs Sdp which may disrupt the timer-recording, on the basis of the timer-recording disrupting program list Sdpt and the timer-recording scheduled program list information Ipts.

The timer-recording controller TRC1 produces a recorder control signal Scr for controlling operation of the recorder 52, i.e., which program to record, and when to start and end recording, on the basis of the timer-recording scheduled program list information Ipts.

The recorder 52 is connected to the external teletext decoder to receive the program signal Sp contained in the broadcast wave and is also connected to the timer-recording controller TRC1 to receive the recorder control signal Scr. The recorder 52 timer-records the timer-recording scheduled programs on a recording medium on the basis of the recorder control signal Scr.

The display 55 is connected to the timer-recording controller TRC1 to receive the program list information Ipt and the timer-recording program and disrupting program list TDp and to display the contents of the information. In addition to displaying the program information, the display 55 may also read characters or graphics stored in memory (not shown) and display strings of characters or graphics. The display 55 is also connected to the recorder 52 to receive the program signal Sp to display a program being broadcast, recorded, or reproduced. When the program signal Sp is the computer data, the recorder 52 may be a computer device.

The timer-recording controller TRC1 includes a broadcast-scheduled program memory 51, a detector (first and second program detectors) 54, a broadcast-scheduled program list producer 100, a timer-recording scheduled program list producer (a timer-recording control correction controller) 200, a timer-recording scheduled program memory 210, and a recorder controller (a timer recording control unit) 220. The broadcast-scheduled program memory 51 is connected to the external teletext decoder to store information at least containing programs' broadcast station Ibs, broadcast date Ibd, broadcast starting time Ibb, broadcast ending time Ibe, and genre Ibj in the input program information It.

Figure 2:
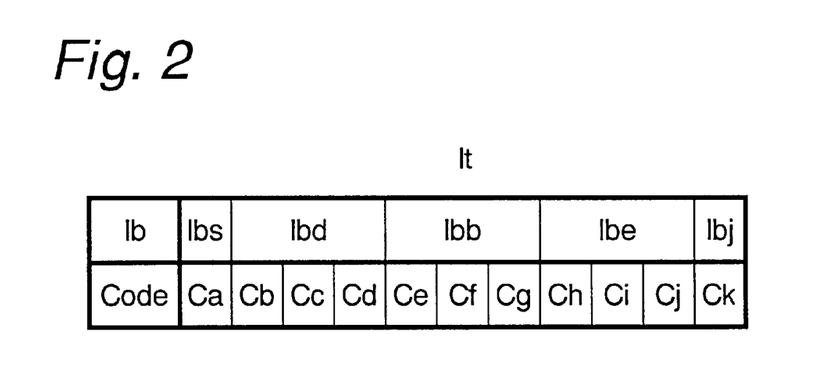
FIG. 2 is a diagram showing an example of program information representing a broadcast program according to the present invention.
Figure 3:
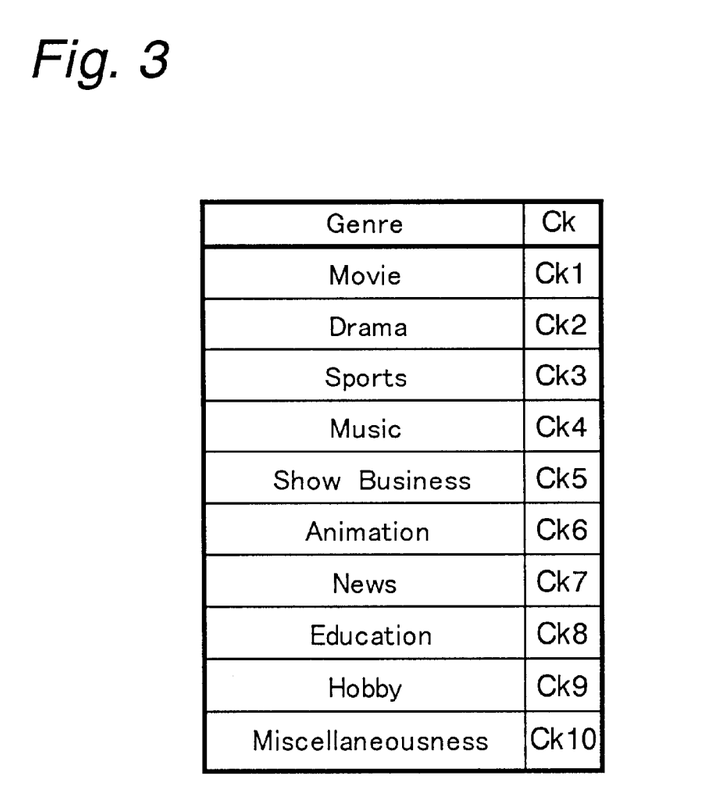
FIG. 3 is a diagram showing an example of subcodes in the program genre code included in the program information shown in FIG. 2.

Referring to FIGS. 2 and 3, the program information It showing a program list will be described in the case of television programs transmitted by teletext. Although television programs are now explained as an example, it is a matter of course that the present invention is not limited to timer-recording of television programs. As shown in the example in FIG. 2, the program information It contains codes individually representing various information. More specifically, the broadcast station information Ibs is composed of a broadcast station code Ca specifying the broadcast station. The broadcast date information Ibd is composed of a broadcast starting year code Cb specifying the broadcast starting year, a broadcast starting month code Cc specifying the broadcast starting month, and a broadcast starting day code Cd specifying the broadcast starting day. The broadcast starting time information Ibb is composed of a broadcast starting hour code Ce specifying the broadcast starting hour, a broadcast starting minute code Cf specifying the broadcast starting minute, and a broadcast starting second code Cg specifying the broadcast starting second. The broadcast ending time information Ibe is composed of a broadcast ending hour code Ch specifying the broadcast ending hour, a broadcast ending minute code Ci specifying the broadcast ending minute, and a broadcast ending second code Cj specifying the broadcast ending second. The genre information Ibj is composed of a program genre code Ck specifying genres of the broadcast programs. The packet of the program information It containing these codes is multiplexed with and broadcast the broadcast wave during the vertical retrace line interval.

Further, as shown in FIG. 3, the program genre code Ck representing the genre information Ibj includes subcodes Ck representing the contents of the genres. These subcodes Ck include a subcode Ck1 representing a movie, a subcode Ck2 representing drama, a subcode Ck3 representing sports, a subcode Ck4 representing music, a subcode Ck5 representing show business, a subcode Ck6 representing animation, a subcode Ck7 representing news, a subcode Ck8 representing education, a subcode Ck9 representing hobby, and a subcode Ck10 representing miscellaneousness, for example.

As stated above, according to the present invention, the program information It for identifying programs is stored in the broadcast-scheduled program memory 51 in advance. Although the program information It has been described with television program broadcasts as an example, the program information It is similarly constructed in data broadcasting typically using computer data which is planned to be put into practice in the future.

Referring to FIG. 1 again, the broadcast-scheduled program list producer 100 is connected to the broadcast-scheduled program memory 51 to produce program list information Ipt showing contents of programs scheduled to be broadcast in a given time range before and after the present time on the basis of the program information It stored in the broadcast-scheduled program memory 51.

The display 55 is connected to the broadcast-scheduled program list producer 100 to display the contents of the broadcast-scheduled programs on the basis of the program list information Ipt. A user operates the user's instructions input unit 56 while seeing the broadcast-scheduled program list displayed in the display 55 to select programs to be scheduled for timer-recording and produce the timer-recording instruction signal Sc.

The timer-recording scheduled program list producer 200 is connected to the broadcast-scheduled program list producer 100 to receive the program list information Ipt and is also connected to the user's instructions input unit 56 to receive the timer-recording instruction signal Sc. The timer-recording scheduled program list producer 200 produces the timer-recording scheduled program list information Ipts for specifying programs requested by the user to be scheduled for timer-recording, on the basis of the timer-recording instruction signal Sc. The timer-recording scheduled program list information Ipts includes various timer-recording scheduled program parameters, such as scheduled broadcast station Sbs, scheduled timer-recording start time Srst, scheduled timer recording end time Sret, and program genre code Ck, and the like, indicating the broadcast station Ibs, broadcast date Ibd, broadcast starting time Ibb, broadcast ending time Ibe, and genre Ibj, of the broadcast programs scheduled for timer recording.

The detector 54 is connected to the broadcast-scheduled program memory 51 to receive the program information It and is also connected to the timer-recording scheduled program list producer 200 to receive the scheduled broadcast station Sbs and scheduled timer-recording start time Srst. The detector 54 searches the program information It on the basis of the scheduled broadcast station Sbs, the scheduled timer-recording start time Srst, and the genre code CkN (N is a positive integer) representing given program contents to find programs which may affect the broadcast starting time of the timer-recording scheduled program, i.e., scheduled timer-recording disrupting candidate programs Sdp. For simplicity, the scheduled timer-recording disrupting candidate program Sdp is referred to as a disrupter candidate program Sdp hereinafter.

The detector 54 then produces a disrupter candidate program list Sdpt showing contents of the detected disrupter candidate programs Sdp. That is to say, the detector 54 searches the program information It recorded in the broadcast-scheduled program memory 51 to find all programs Sdp having broadcast station information Ibs identical to the scheduled broadcast station Sbs, broadcast start time information Ibb representing time earlier than the scheduled timer-recording start time Srst, and program genre code Ck matching with the given program genre code CkN, and produces the disrupter candidate program list Sdpt.

A genre which is often prolonged beyond the scheduled broadcast ending time, like sports game programs which are often prolonged until the game ends, is selected as the given program genre code CkN. In this sense, the program genre code CkN can be defined as a scheduled timer-recording disrupting genre code CkN. Also, as well as the sports game program, any arbitrary genre may be previously set as the scheduled timer-recording disrupting genre CkN, or the user may enter any arbitrary genre as the scheduled timer-recording disrupting genre CkN when operating the user's instructions input unit 56 to schedule a timer-recording.

The timer-recording scheduled program list producer 200 is also connected to the detector 54 to receive the disrupter candidate program list Sdpt to produce the timer-recording program and disrupting program list TDp showing the already produced timer-recording scheduled program list information Ipts and the disrupter candidate program list Sdpt in comparison. The display 55 is connected to the timer-recording scheduled program list producer 200 to display the contents of the timer-recording program and disrupting program list TDp to the user.

The user checks the timer-recording program and disrupting program list TDp displayed in the display 55 to decide whether to prolong the scheduled timer-recording end time Sret set for the program scheduled for timer recording. When the user decides to prolong it, the user enters the decision and a prolonging time Tp as the timer-recording instruction signal Sc into the timer-recording scheduled program list producer 200 (the timer-recording controller TRCL) by using the user's instructions input unit 56.

The timer-recording scheduled program list producer 200 rewrites the scheduled timer-recording end time Sret to the time prolonged by the prolonging time Tp on the basis of the timer-recording instruction signal Sc and reproduces the timer-recording scheduled program list information Ipts and outputs it to the display 55 and the timer-recording scheduled program memory 210.

The timer-recording scheduled program memory 210 is connected to the timer-recording scheduled program list producer 200 to receive and store the reproduced timer-recording scheduled program list information Ipts.

The display 55 shows the contents of the timer-recording scheduled program list information Ipts to the user as a part of the disrupting program list TDp. When the user is satisfied with the contents of the presented timer-recording scheduled program list information Ipts, the user inputs the decision into the timer-recording scheduled program list producer 200 as the timer-recording instruction signal Sc by operating the user's instructions input unit 56. When the user is not satisfied with the contents of the timer-recording scheduled program list information Ipts, the user decides and inputs a desired prolonging time Tp while checking the timer-recording program and disrupting program list TDp displayed in the display 55. That is to say, the user inputs the prolonging time Tp for the scheduled timer-recording end time Sret into the timer-recording scheduled program list producer 200 for each timer-recording scheduled program Srp by considering all disrupter candidate programs Sdp shown in the timer-recording program and disrupting program list TDp to produce the timer-recording scheduled program list information Ipts.

The recorder controller 220 is connected to the timer-recording scheduled program memory 210 to receive the timer-recording scheduled program list information Ipts. The recorder controller 220 produces the recorder control signal Scr for controlling operation of the recorder 52 on the basis of the scheduled broadcast station Sbs, scheduled timer-recording start time Srst, and scheduled timer-recording end time Sret defined in the timer-recording scheduled program list information Ipts. The recorder 52 is a device for recording broadcast programs, such as a recording/reproducing device like a video tape recorder, for example.

As described above, a user inputs a timer-recording scheduled program by using the user's instructions input unit 56.

In response to the input, the timer-recording controller TRC1 presents a list of programs which may possibly affect the ending time (broadcast time) of the timer-recording scheduled program so that the user can set the recorder 52 to delay the recording end time by a desired time length.

The operation of the timer-recording controller TRC1 will be described referring to the flowchart shown in FIG. 4.

First, in step S2, the broadcast-scheduled program list producer 100 produces the program list information Ipt representing contents of programs scheduled to be broadcast on the basis of the program information It stored in the broadcast-scheduled program memory 51. The display 55 then displays a broadcast-scheduled program list Pt as an image on the basis of the program list information Ipt.

In step S4, the user determines programs to be scheduled for timer-recording referring to the program list Pt displayed in the display 55 in step S2. Then the user operates the user's instructions input unit 56 to produce the timer-recording instruction signal Sc representing the determined contents of scheduling for timer recording and to output it to the timer-recording controller TRC1. The timer-recording scheduled program list producer 200 in the timer-recording controller TRC1 sets the timer-recording on the basis of the input of the timer-recording instruction signal Sc and produces the timer-recording scheduled program list information Ipts. That is to say, on the basis of the timer-recording instruction signal Sc, the timer-recording scheduled program list producer 200 extracts the timer-recording scheduled programs' broadcast station information Ibs (broadcast station code Ca), broadcast date information Ibd (broadcast starting year code Cb, broadcast starting month code Cc, broadcast starting day code Cd), broadcast starting time information Ibb (broadcast starting hour code Ce, broadcast starting minute code Cf, broadcast starting second code Cg), broadcast ending time information Ibe (broadcast ending hour code Ch, broadcast ending minute code Ci, broadcast ending second code Cj) from the program list information Ipt inputted from the broadcast-scheduled program list producer 100.

In step S6, the timer-recording scheduled program list producer 200 detects, by using the detector 54, whether any program in a particular genre is scheduled to be broadcast before the broadcast time of the timer-recording scheduled program from the same broadcast station, i.e., on the same channel, as the timer-recording scheduled program. That is to say, the detector 54 searches the program information It stored in the broadcast-scheduled program memory 51 to detect programs having the same broadcast station information Ibs as the scheduled broadcast station Sbs of the timer-recording scheduled program, the broadcast starting time information Ibb preceding the scheduled timer-recording start time Srst, and the genre code CkN representing given program contents, as the disrupter candidate programs Sdp. The subcode Ck3 representing sports is set as the code CkN specifying the particular program genre, for example.

In step S8, if no disrupter candidate program Sdp is detected by the search in step S6, that is, if no program having the corresponding broadcast station information Ibs, broadcast starting time information Ibb, and program genre code CkN is detected, a decision of NO is made. The process then moves to step S38.

In step S38, the broadcast end time information Ibe is set as the scheduled timer-recording end time Sret and the process is ended.

If any disrupter candidate program Sdp is detected in step S8, that is to say, if some program may be prolonged beyond the scheduled timer-recording start time Srst of the timer-recording scheduled program, like sports (Ck3) instead of ending at the ending time defined in the broadcast end time information Ibe, a decision of YES is made and the process moves to step S10.

In step S10, the detector 54 produces the disrupter candidate program list Sdpt showing the contents of all disrupter candidate programs Sdp searched out. Then the timer-recording scheduled program list producer 200 produces the timer-recording program and disrupting program list TDp on the basis of the disrupter candidate program list Sdpt and the program list information Ipt. Further, the display 55 displays the timer-recording program and disrupting program list TDp.

In step S12, the user checks the timer-recording program and disrupting program list TDp displayed in the display 55 to determine whether to prolong the scheduled timer-recording end time Sret of the timer-recording scheduled program. When the scheduled timer-recording end time Sret is not prolonged, the process moves to the above-described step S38 and is ended. When the scheduled timer-recording end time Sret should be prolonged, the process moves to step S14.

In step S14, the timer-recording scheduled program list producer 200 displays a predetermined standard prolonging time Tpp for each of the detected disrupter candidate programs Sdp in the timer-recording program and disrupting program list TDp. Then the process moves to next step S16.

In step S16, the user determines whether the standard prolonging time Tpp is suitable as the prolonging time Tp for prolonging the scheduled timer-recording end time Sret for the timer-recording scheduled program Srp. When the standard prolonging time Tpp is determined to be suitable, the process moves to step S20.

In step S20, the prolonging time initial value is set as the prolonging time Tp. Then the process moves to step S36.

When the standard prolonging time Tpp is determined not to be suitable in step S16, the process moves to step S18.

In step S18, the user inputs a prolonging time Tp by using the user's instructions input unit 56. The process then moves to step S36.

In step S36, the scheduled timer-recording end time Sret is rewritten to the time extended for the prolonging time Tp and the timer-recording scheduled program list information Ipts is reproduced and stored into the timer-recording scheduled program memory 210.

When a decision of NO is made in step S8 and step S12, the broadcast end time Ibe of the timer-recording scheduled program Srp is set as the scheduled timer-recording end time Sret in step S38 and the timer-recording scheduled program list information Ipts is reproduced and stored into the timer-recording scheduled program memory 210.

In this way, according to the timer-recording controller TRC1 of the present invention, when there is a timer-recording disrupting program, i.e., when some program in a particular genre is scheduled to be broadcast prior to a timer-recording scheduled program from the same broadcast station (channel) as the timer-recording scheduled program, the information is presented to the user as a timer-recording disrupting program list, and an inquiry is made to the user to see whether to delay the recording end time for the timer-recording scheduled program. Then the user checks the presented timer-recording disrupting program list to determine whether to change the scheduled recording end time, so as to set the timer-recording in a convenient way.

(Second Embodiment)

Figure 5:
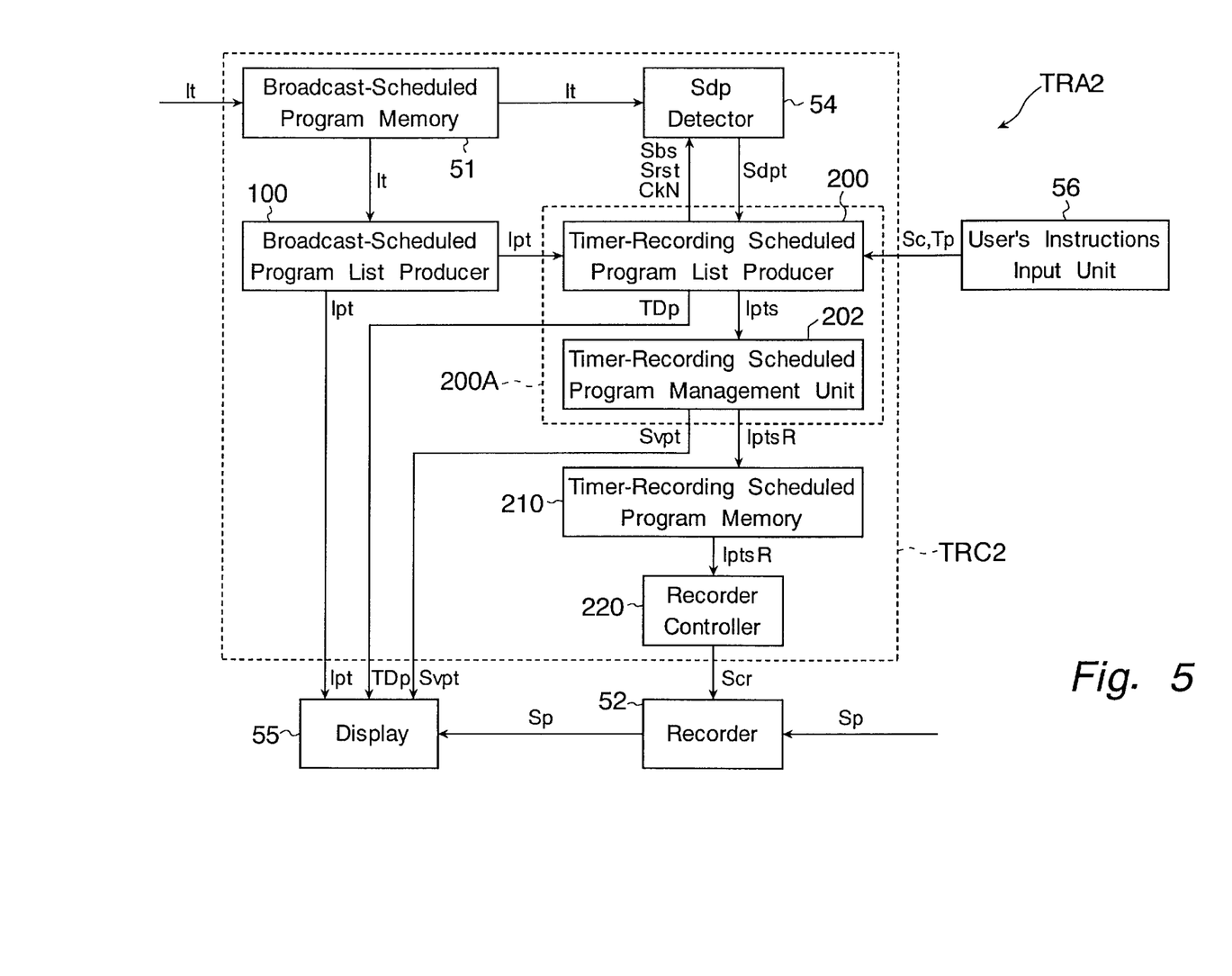
FIG. 5 is a block diagram showing a timer-recording apparatus containing a timer-recording controller according to a second embodiment of the present invention.
Figure 6:
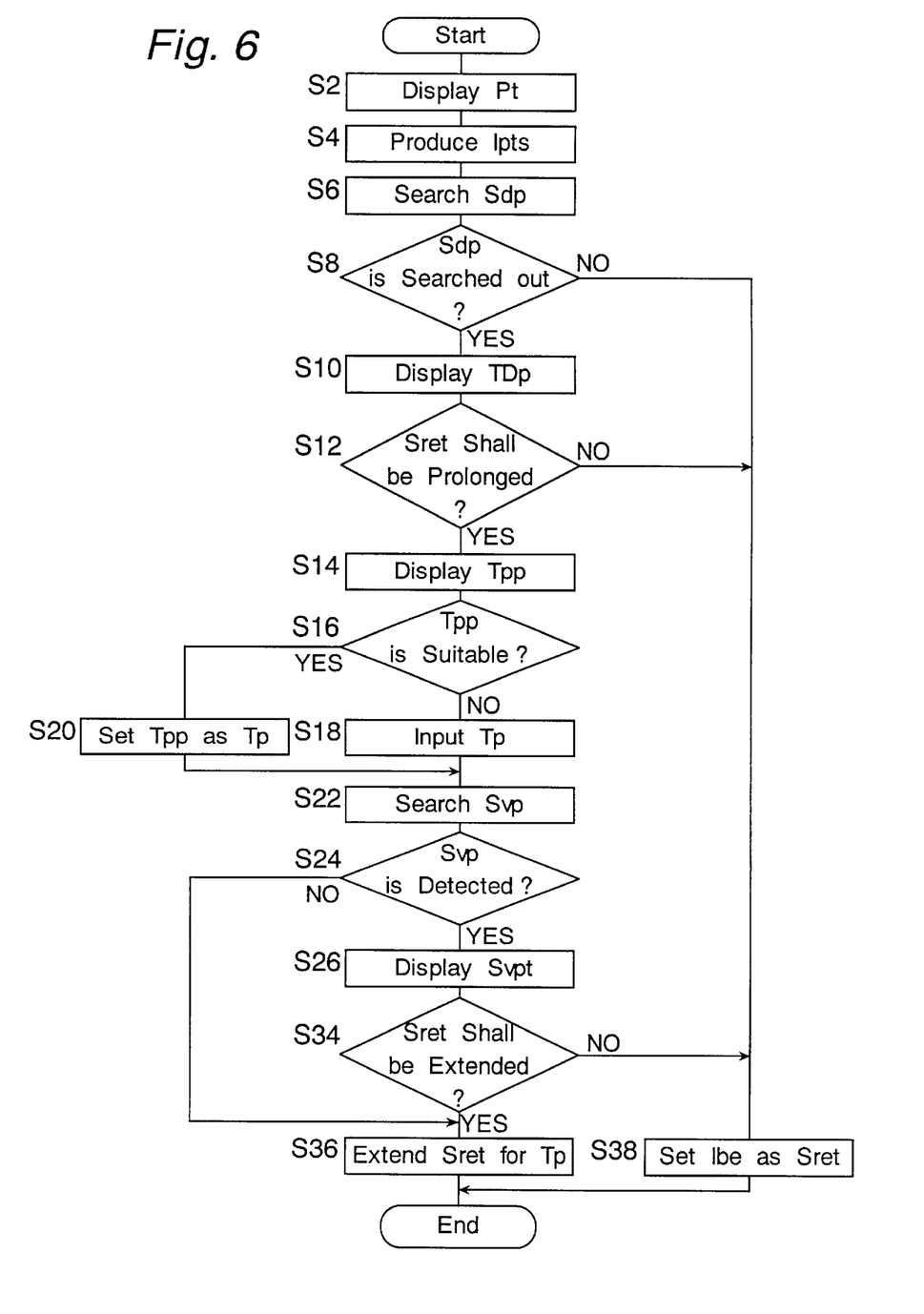
FIG. 6 is a flowchart showing operation of the timer-recording controller shown in FIG. 5.

A timer-recording controller according to a second embodiment of the present invention will now be described referring to FIGS. 5 and 6. As shown in FIG. 5, a timer-recording controller TRC2 of this embodiment additionally includes a timer-recording scheduled program management unit 202 between the timer-recording scheduled program list producer 200 and the timer-recording scheduled program memory 210 in the timer-recording controller TRC1 shown in FIG. 1. The additional timer-recording scheduled program management unit 202 and the timer-recording scheduled program list producer 200 form a first timer-recording manager 200A.

Figure 4:
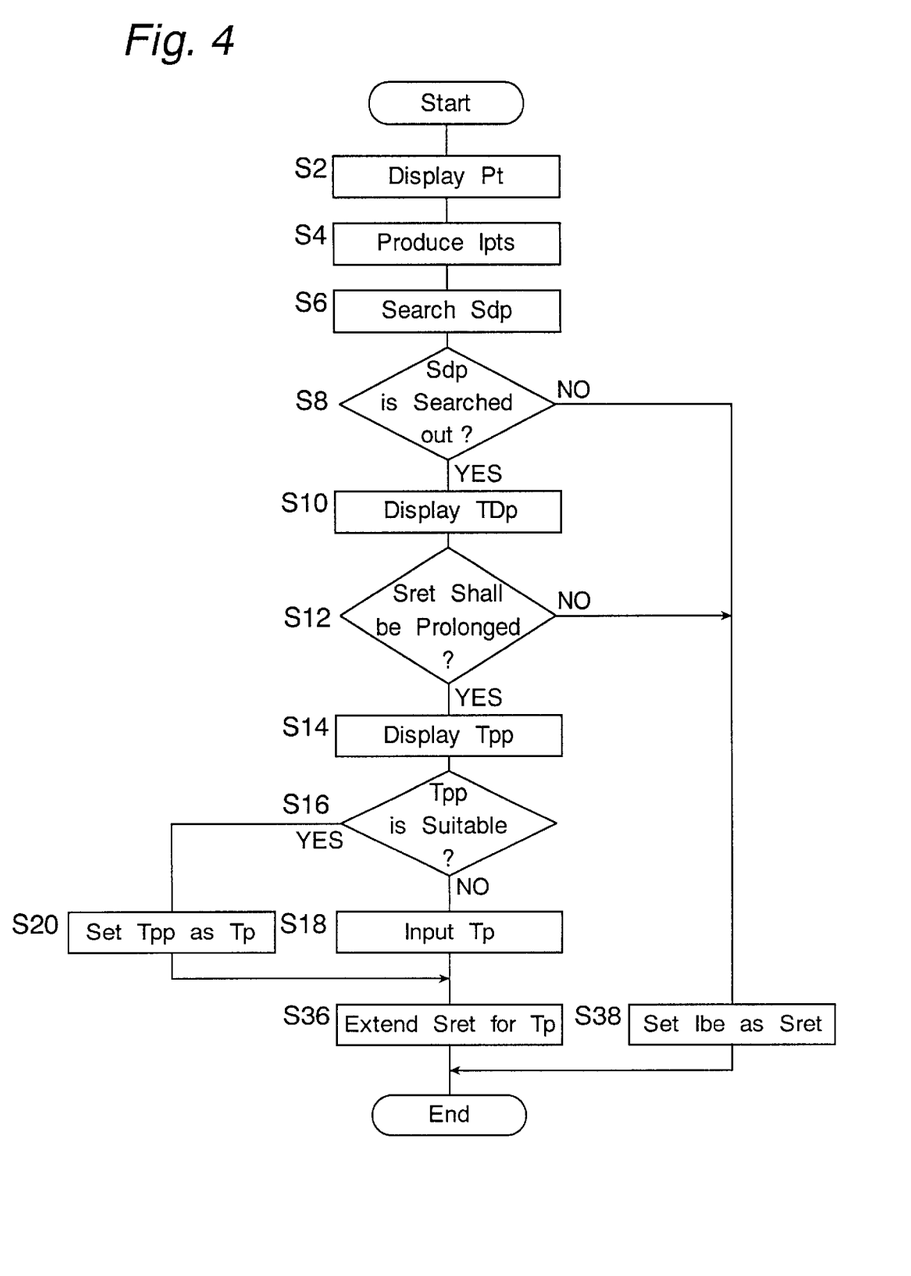
FIG. 4 is a flowchart showing operation of the timer-recording controller shown in FIG. 1.

When the user prolongs the scheduled timer-recording end time Sret for a timer-recording scheduled program by a desired prolonging time Tp, the timer-recording scheduled program management unit 202 searches the timer-recording scheduled program list information Ipts on the basis of the scheduled timer-recording end time Sret updated in step S18 or step S20 described referring to FIG. 4 to find a following timer-recording scheduled program Srp whose scheduled timer-recording time may be influenced by the extension of recording, as a timer-recording victim candidate program Svp. In this case, the scheduled broadcast station Sbs is not included in the search condition.

For simplicity, the timer-recording victim candidate program Svp is referred to as a victim candidate program Svp. The timer-recording scheduled program Srp which may serve as a disrupter candidate program Sdp to a following victim candidate program Svp if the scheduled timer-recording end time Sret is prolonged is referred to as an affecting program candidate Apc.

The timer-recording scheduled program management unit 202 also produces a victim candidate program list Svpt showing all victim candidate programs Svp detected, and outputs it to the display 55.

The user checks the victim candidate program list Svpt displayed in the display 55 to determine whether to prolong the scheduled timer-recording end time Sret for the timer-recorded scheduled program. When the user determines to prolong the time, the user inputs the determination and the prolonging time Tp as the timer-recording instruction signal Sc into the timer-recording scheduled program list producer 200 (the timer-recording controller TRC2) by using the user's instructions input unit 56.

When one program is scheduled to be timer-recorded, it is effective to prolong the scheduled timer-recording end time Sret for the timer-recording scheduled program Srp by a given prolonging time Tp to avoid influence by a preceding disrupter candidate program Sdp, as described in the first embodiment. However, when a plurality of programs are scheduled to be timer-recorded, prolonging the scheduled timer-recording end time Sret for one timer-recording scheduled program Srp may invade the broadcast start time information Ibb for a following timer-recording scheduled program Srp. Especially, when the two timer-recording scheduled programs Srp are to be broadcast from different sources, the preceding timer-recording scheduled program Srp may be continuously recorded even after the broadcast start time Ibb of the following timer-recording scheduled program Srp. In this case, the preceding timer-recording scheduled program Srp acts as a disrupter candidate program Sdp to the following timer-recording scheduled program.

Accordingly, in this embodiment, the first timer-recording manager 200A detects a timer-recording scheduled program SrpO (O is a positive integer) which may act as a disrupter candidate program Sdp to a following timer-recording scheduled program SrpP (P is an integer larger than O) and inquires appropriate operations from the user. In response to the inquiry about from the first timer-recording manager 200A, the user inputs the timer-recording instruction signal Sc representing the user's intention into the first timer-recording manager 200A. The timer recording scheduled program management unit 202 produces timer-recording scheduled program list information IptsR on the basis of the intention of the user (Sc). The timer-recording scheduled program memory 210 stores the timer-recording scheduled program list information IptsR and the recorder controller 220 produces the recorder control signal Scr on the basis of the timer-recording scheduled program list information IptsR.

The operation of the timer-recording controller TRC2 will be described referring to the flowchart shown in FIG. 6. The flowchart in FIG. 6 additionally contains steps S22, S24, S26 and S34 interposed between step S18 and step S36 in the flowchart of FIG. 4. Hence the operation will be described only about processes related to the new steps, leaving those already explained referring to FIG. 4 to the reader.

That is to say, the processes from step S2 to step S16 are carried out and the prolonging time Tp is appropriately set in step S18 or S20, and then the process moves to step S22.

In step S22, the timer-recording scheduled program management unit 202 searches the timer-recording scheduled program list information Ipts on the basis of the updated scheduled timer-recording end time Sret to find a victim candidate program Svp which may be affected by the extension of the scheduled timer-recording end time Sret requested in step S12. Then the process moves to next step S24.

In step S24, a determination is made as to whether a victim candidate program Svp has been detected. If no victim candidate program Svp has been detected, a determination of NO is made and the operation moves to step S36. If some victim candidate program Svp has been detected, a determination of YES is made and the operation moves to step S26.

In step S26, the timer-recording scheduled program management unit 202 produces and outputs a victim candidate program list Svpt showing all victim candidate programs Svp and the display 55 displays the list. The process then moves to step S34.

In step S34, the user considers how the individual victim candidate programs Svp displayed in the victim candidate program list Svpt are affected when the scheduled timer-recording end time Sret is prolonged as decided in step S12. Then the user decides whether to execute the prolonging process. When the time extension in step S12 is to be carried out, the process moves to step S36. When it is not prolonged, the process moves to step S38.

As described above, in steps S22 and S24, the scheduled timer-recording start times Srst for following timer-recording scheduled programs Srp are searched according to the time (Sret) delayed by the prolonging time Tp after the scheduled timer-recording end time Sret for a victim candidate program Svp (SrpO), so as to detect whether any timer-recording scheduled program Srp following the program delayed by the prolonging time Tp becomes a victim candidate program Svp. The user checks the results of the search in step S26 to determine whether to prolong the scheduled timer-recording end time Sret for the victim candidate program Svp in step S34. Then the scheduled timer-recording end time Sret is appropriately set in step S36 or step S38 according to the determination of the user. As has been explained, this embodiment solves the problem that, even if a victim candidate program Svp is found, simply prolonging its scheduled timer-recording end time Sret may cause the victim candidate program SvpO itself to serve as a disrupter candidate program Sdp to a following timer-recording scheduled program Srp.

(Third Embodiment)

Figure 7:
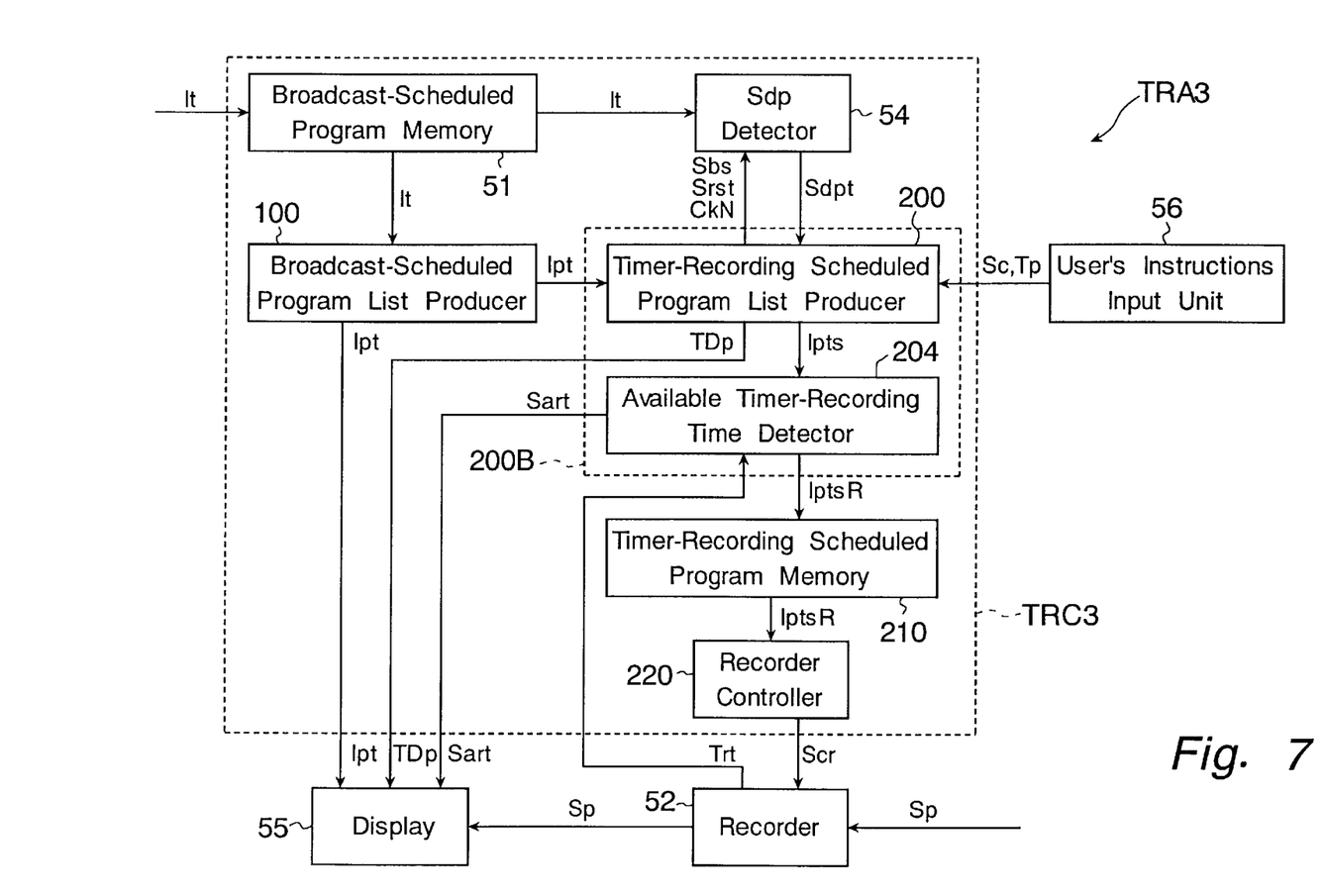
FIG. 7 is a block diagram showing a timer-recording apparatus containing a timer-recording controller according to a third embodiment of the present invention.
Figure 8:
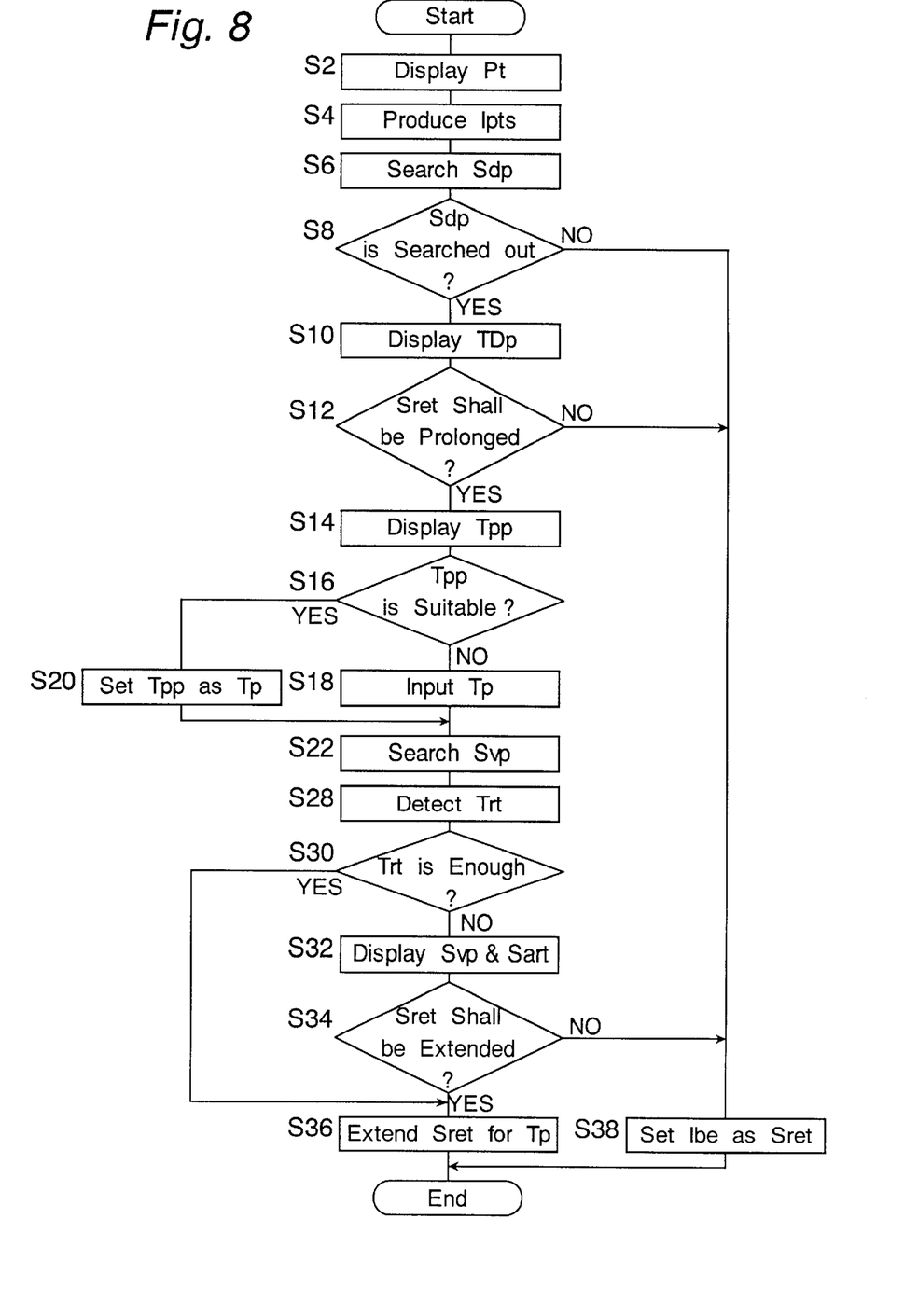
FIG. 8 is a flowchart showing operation of the timer-recording controller shown in FIG. 7.

A timer-recording controller according to a third embodiment of the present invention will be described referring to FIGS. 7 and 8. As shown in FIG. 7, a timer-recording controller TRC3 of this embodiment has an available timer-recording time detector 204 in place of the timer-recording scheduled program management unit 202 in the timer-recording controller TRC2 shown in FIG. 5. The available timer-recording time detector 204 and the timer-recording scheduled program list producer 200 form a second timer-recording manager 200B.

The available timer-recording time detector 204 is connected to the recorder 52 to detect available timer-recording time Trt remaining in a recording medium in the recorder 52 to produce a timer-recording capacity signal Sart. The available timer-recording time detector 204 outputs the timer-recording capacity signal Sart to the display 55 to display the available timer-recording time Trt in the recorder 52.

The user checks the available timer-recording time displayed in the display 55 to determine whether to schedule a timer-recording, and whether to prolong the scheduled timer-recording end time Sret for a timer-recording scheduled program. The user then inputs the determination as the timer-recording instruction signal Sc into the timer-recording scheduled program list producer 200 by using the user's instructions input unit 56.

The operation of the timer-recording controller TRC3 will be described referring to the flowchart shown in FIG. 8. The flowchart shown in FIG. 8 additionally contains step S28 after step S22 in the flowchart shown in FIG. 6, and steps S30 and S32 in place of steps S24 and S26. Accordingly, the operation will be described only about these new steps, leaving the operations already described referring to FIG. 6.

Similarly to the operation of the timer-recording controller TRC2 of the second embodiment, the processes from step S2 to step S22 are carried out and victim candidate programs Svp are found out, and then the process moves to step S28.

In step S28, the available timer-recording time detector 204 detects the available timer-recording time Trt.

In step S30, the available timer-recording time detector 204 determines whether the available timer-recording time in the recording medium in the recorder 52 is enough for the prolonging time Tp set in step S18 and step S20 on the basis of the available timer-recording time Trt. When a decision of YES is made, the process moves to step S36 to prolong the scheduled timer-recording end time Sret by the prolonging time Tp. In the case of NO, the process moves to step S32.

In step S32, the display 55 displays the available timer-recording time Trt in the recording medium in the recorder 52 and victim candidate programs Svp to the user on the basis of the timer-recording capacity signal Sart provided from the available timer-recording time detector 204. Then the process moves to step S34.

As stated above, the available timer-recording time Trt for the recorder 52 is detected in step S28, and if the available timer-recording time Trt is longer than the prolonging time Tp set in step S18 and S20, the scheduled timer-recording end time Sret is delayed by the prolonging time Tp in step S36 in accordance with the intention of the user. When the available timer-recording time Trt is shorter than the prolonging time Tp, the user is informed of the fact in step S32 and prompted to make a decision in step S34. Thus, in this embodiment, a method for prolonging the scheduled timer-recording time can be selected in accordance with the remaining capacity (available timer-recording time) in the recording medium in the recorder 52.

(Fourth Embodiment)

Figure 9:
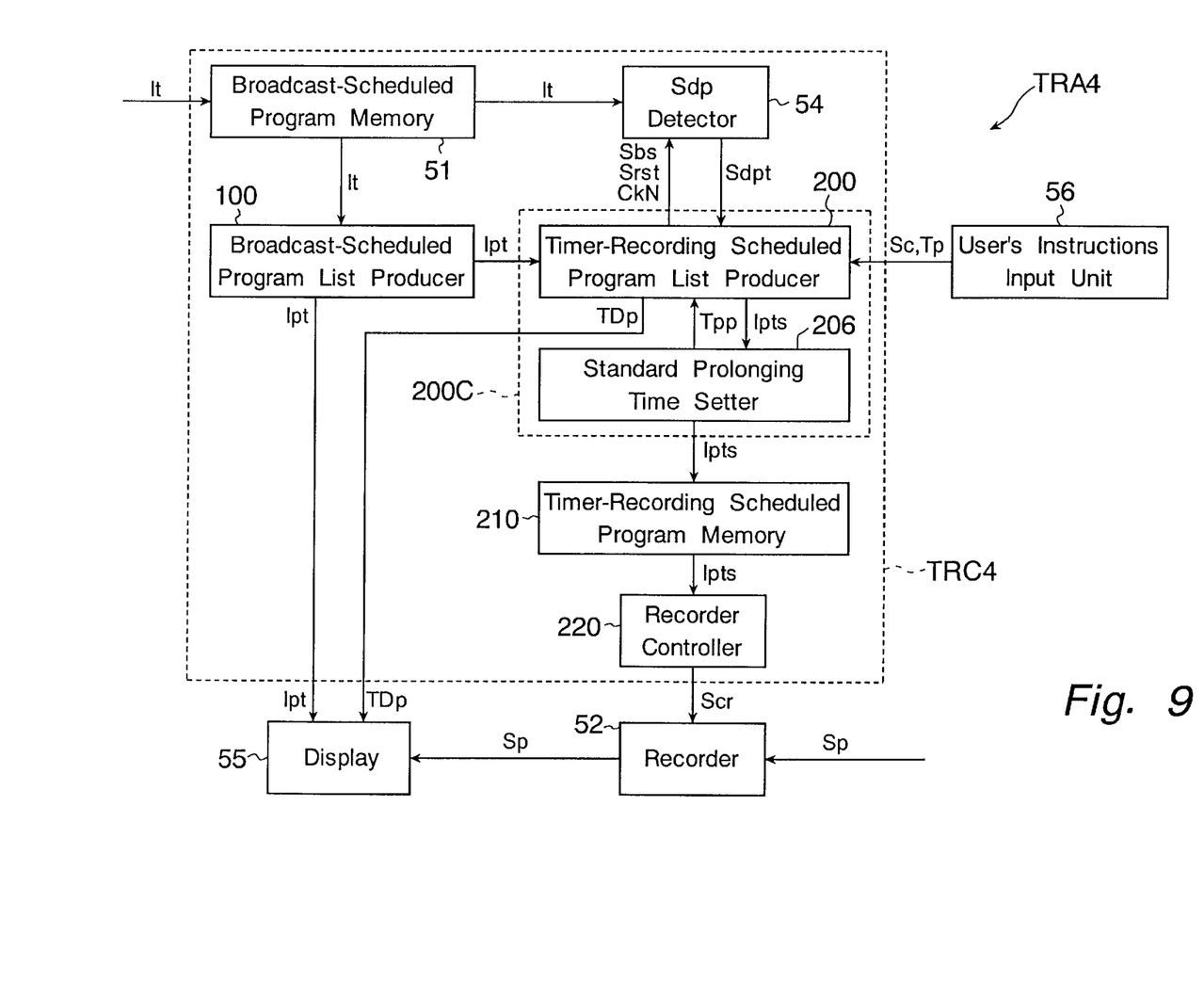
FIG. 9 is a block diagram showing a timer-recording apparatus containing a timer-recording controller according to a fourth embodiment of the present invention.
Figure 10:
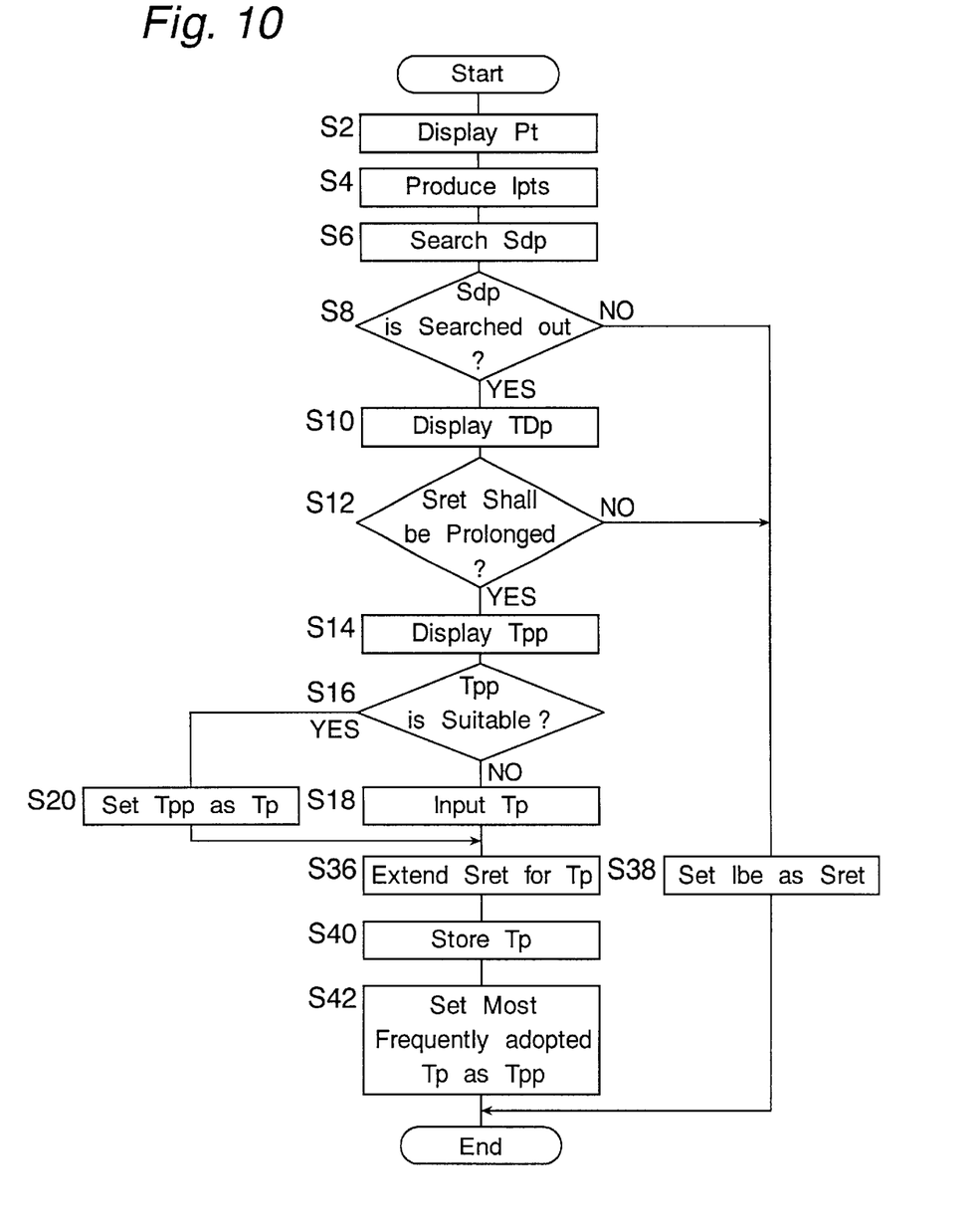
FIG. 10 is a flowchart showing operation of the timer-recording controller shown in FIG. 9.

A timer-recording controller according to a fourth embodiment of the present invention will be described referring to FIGS. 9 and 10. As shown in FIG. 9, a timer-recording controller TRC4 of this embodiment has a standard prolonging time setter 206 interposed between the timer-recording scheduled program list producer 200 and the timer-recording scheduled program memory 210 in the timer-recording controller TRC1 shown in FIG. 1. The standard prolonging time setter 206 and the timer-recording scheduled program list producer 200 form a third timer-recording manager 200C.

The standard prolonging time setter 206 takes statistics of the prolonging times Tp specified by the user on the basis of the timer-recording scheduled program list information Ipts inputted from the timer-recording scheduled program list producer 200. Then, according to the statistics, it outputs a prolonging time Tp which is most frequently adopted by the user as a standard prolonging time Tpp to the timer-recording scheduled program list producer 200. Thus, the standard prolonging time Tpp is automatically updated on the basis of the frequency in selection made by the user to save the user from inputting a prolonging time Tp in place of a prolonging time Tp suggested by the timer-recording controller TRC4.

The operation of the timer-recording controller TRC4 will be described referring to FIG. 10. The flowchart shown in FIG. 10 additionally includes steps S40 and S42 after step S36 in the flowchart shown in FIG. 4. Accordingly, the operation will be described only about those related to the new steps, excluding the operation already described referring to FIG. 4.

Similarly to the operation of the timer-recording controller TRC1 of the first embodiment, the processes from step S2 to step S36 are carried out, and the standard prolonging time setter 206 takes statistics of the prolonging times Tp in step S40.

In step S42, the standard prolonging time setter 206 outputs the most frequently adopted prolonging time Tp in the statistics collected in step S40 as the standard prolonging time Tpp to the timer-recording scheduled program list producer 200.

Statistics are thus taken about the prolonging times Tp adopted by the user and an adaptive value in the statistical data is stored as the standard prolonging time Tpp and outputted to the timer-recording scheduled program list producer 200. In the next operation, the updated standard prolonging time Tpp is suggested to th euser in step S14. The statistics may be collected for each genre and an initial value may be set for each genre.

In the above-described embodiments, the user may set the scheduled timer-recording end time Sret itself, as well as the prolonging time Tp for which the scheduled timer-recording end time Sret is delayed. As described above, in this embodiment, the standard prolonging time Tpp is set by using statistics on past prolonging times, which reduces the user's trouble of setting the prolonging time and allows timer-recording scheduled programs to be recorded without being cut.

As has been explained, when scheduling a timer recording, the timer-recording controllers of the present invention detect whether some program preceding the timer-recorded scheduled program may possibly be prolonged by using program information stored. On the basis of the detected result, the scheduled timer-recording end time can be set to a time delayed for a given time after the scheduled broadcast end time. This alleviates the problem of the recording being interrupted because a preceding program is prolonged. Further, users can be informed whether any program may be prolonged prior to the timer-recording scheduled program so that they can decide whether to prolong the timer-recording scheduling.

Moreover, users can set the most appropriate recording end time in accordance with contents of the detected programs.

Further, a most frequently adopted prolonging time Tp can be set as the standard prolonging time Tpp from among prolonging times Tp set by the user in the past, which provides a timer-recording controller capable of reducing the user's trouble of setting the most appropriate recording end time.

While the invention has been described in detail, the foregoing description is in all aspects illustrative and not restrictive. It is understood that numerous other modifications and variations can be devised without departing from the scope of the invention.

What is claimed is:

1. A timer-recording controller receiving a broadcast signal multiplexed with program information containing information representing broadcast sources, broadcast starting times, broadcast ending times, and genres of a plurality of broadcast-scheduled programs, for controlling a recorder on the basis of the program information to timer-record at least one particular program among the plurality of programs, said timer-recording controller comprising:
    a timer-recording control unit operable to cause the recorder to start recording a particular program from a broadcast source of the broadcast signal at a broadcast starting time of the particular program and end the recording at a broadcast ending time of the particular program;
    a first program detector operable to detect a program which may delay the broadcast starting time of the particular program from among a plurality of broadcast-scheduled programs; and
    a timer-recording control correction controller operable to delay a time at which the recorder ends the recording by a desired time based on a result detected by said first program detector.

2. The timer-recording controller according to claim 1, wherein said timer-recording control correction controller is further operable to not delay the time at which the recorder ends the recording if said first program detector does not detect a program which may delay the broadcast starting time of the particular program.

3. The timer-recording controller according to claim 1, wherein said first program detector detects, from program information, a program in a particular genre broadcast from the same broadcast source as the particular program at a broadcast starting time earlier than the broadcast starting time of the particular program.

4. The timer-recording controller according to claim 1, further comprising a display operable to display a result detected by said first program detector.

5. The timer-recording controller according to claim 4, further comprising an input device operable to allow a user to input an arbitrary time as the desired time while checking the result displayed on said display.

6. The timer-recording controller according to claim 1, further comprising a second program detector operable to detect a program scheduled to start at a broadcast starting time earlier than the time at which the recorder ends the recording delayed by the desired time from among particular programs.

7. The timer-recording controller according to claim 6, wherein said second program detector detects only a program broadcast from a broadcast source different from the broadcast source of the particular program which is delayed by the desired time from among the detected programs.

8. The timer-recording controller according to claim 6, further comprising a display operable to display a result detected by said first program detector and a result detected by said second program detector.

9. The timer-recording controller according to claim 8, further comprising an input device operable to allow a user to input an arbitrary time as the desired time while checking the results displayed on said display.

10. The timer-recording controller according to claim 1, further comprising an available recording time detector operable to detect an available recording time in the recorder, wherein the time at which the recorder ends the recording is delayed by the desired time based on the available recording time.

11. The timer-recording controller according to claim 10, further comprising:
- a recording time comparing unit operable to compare the available recording time and a recording time of the particular program when delayed by the desired time; and
- a timer-recording managing unit operable to delay the time at which the recorder ends recording by the desired time when the available recording time is longer than the recording time.

12. The timer-recording controller according to claim 11, further comprising a display operable to display a result detected by said first program detector and the available recording time when the available recording time is shorter than the recording time.

13. The timer-recording controller according to claim 12, further comprising an input device operable to allow a user to input an arbitrary time as the desired time while checking the display on said display.

14. The timer-recording controller according to claim 5, wherein said timer-recording control correction controller comprises a delay time suggesting device operable to suggest a given delay time for the desired time.

15. The timer-recording controller according to claim 14, wherein said delay time suggesting device updates the given delay time based on statistics taken from desired times inputted by the user.

* * * * *